(12) United States Patent
Romero Ricon

(10) Patent No.: US 11,945,389 B2
(45) Date of Patent: Apr. 2, 2024

(54) COMFORTABLE RESTRAINT SYSTEM

(71) Applicant: SUMCAB INVERSIONES, S.L., Les Franqueses del Valles (ES)

(72) Inventor: Manuel Romero Ricon, Les Franqueses del Valles (ES)

(73) Assignee: SUMCAB INVERSIONES, S.L., Les Franqueses del Valles (ES)

( * ) Notice: Subject to any disclaimer, the term of this patent is extended or adjusted under 35 U.S.C. 154(b) by 208 days.

(21) Appl. No.: 17/618,023

(22) PCT Filed: Apr. 28, 2020

(86) PCT No.: PCT/ES2020/070275
§ 371 (c)(1),
(2) Date: Dec. 10, 2021

(87) PCT Pub. No.: WO2020/249835
PCT Pub. Date: Dec. 17, 2020

(65) Prior Publication Data
US 2022/0258687 A1 Aug. 18, 2022

(30) Foreign Application Priority Data
Jun. 12, 2019 (ES) .................................. 201930536

(51) Int. Cl.
*B60R 21/18* (2006.01)
*B60R 22/00* (2006.01)
*B60R 22/19* (2006.01)

(52) U.S. Cl.
CPC .............. *B60R 21/18* (2013.01); *B60R 22/00* (2013.01); *B60R 22/19* (2013.01)

(58) Field of Classification Search
CPC .......... B60R 21/18; B60R 22/19; B60R 22/00
See application file for complete search history.

(56) References Cited

U.S. PATENT DOCUMENTS

| 5,765,869 | A  | * | 6/1998 | Huber | ................... | B60R 22/195 |
| | | | | | | 280/733 |
| 6,170,863 | B1 | * | 1/2001 | Takeuchi | ................ | B60R 21/18 |
| | | | | | | 280/733 |
| 6,340,173 | B1 | * | 1/2002 | Specht | ................... | B60R 21/18 |
| | | | | | | 280/733 |

(Continued)

FOREIGN PATENT DOCUMENTS

DE             3012350 A1   10/1981
DE      102004056496 A1    5/2006
(Continued)

*Primary Examiner* — Milton Nelson, Jr.
(74) *Attorney, Agent, or Firm* — The Webb Law Firm

(57) ABSTRACT

The invention discloses a comfortable restraint system located in a vehicle incorporating an electronic braking system governed by a control unit, and including a safety belt configured by a textile strap and a chamber attached longitudinally on each side of the textile strap, and also including a permanent anchoring device which in turn includes means for the coupling of an anchor tongue and a number of connector outlets for the supply and extraction of compressed air via a compression system, the chambers being connected to the connector outlets by means of adaptors, in such a way that they connect pneumatically to the compression system, which is governed by the vehicle control unit.

7 Claims, 5 Drawing Sheets

(56) References Cited

U.S. PATENT DOCUMENTS

| | | | |
|---|---|---|---|
| 7,434,833 B2 * | 10/2008 | Kore | ........................ B60R 21/18 |
| | | | 280/805 |
| 2006/0012159 A1 | 1/2006 | Kore | |
| 2006/0076764 A1 | 4/2006 | Freeman et al. | |
| 2016/0075299 A1 * | 3/2016 | Wang | ........................ B60R 22/34 |
| | | | 280/733 |

FOREIGN PATENT DOCUMENTS

| | | | | |
|---|---|---|---|---|
| DE | 102011109616 A1 | | 2/2013 | |
| DE | 102014204186 A1 * | | 9/2015 | ............. B60R 21/18 |
| EP | 0421951 A1 | | 4/1991 | |
| JP | 2000211461 A | | 8/2000 | |

\* cited by examiner

COMFORTABLE RESTRAINT SYSTEM

CROSS-REFERENCE TO RELATED APPLICATIONS

This application is the United States national phase of International Application No. PCT/ES2020/070275 filed Apr. 28, 2020, and claims priority to Spanish Patent Application No. P201930536 filed Jun. 12, 2019, the disclosures of which are hereby incorporated by reference in their entirety.

BACKGROUND

Field of the Invention

The present invention relates to a restraint system comprising a safety belt that incorporates air chambers making it so the adjustment of the belt on the user's body does not have to be so tight, providing a high degree of comfort.

The present invention is particularly applicable in the field of safety elements in transport vehicles.

Technical Background

In the current state of the art, restraint systems using belts have evolved from a basic concept of simply providing a stop for the movement of the user's body to applying different degrees of tension, including stops that are activated when a certain level of advancement is reached or if a sudden movement is produced.

In any of these cases, however, the initial tension of the belt, once adjusted on the user's body, is continuous and has a greater tendency to be tighter than looser, due to the fact that if an accident happens, the belt must be in contact with the body to be able to stop the movement of the same as soon as possible.

However, this tightness of the safety belt on the user's body can cause discomfort given that the user has limited movement due to the pressure of the belt, generating heat due to the pressure of the belt and wrinkles in the user's clothing, among other drawbacks.

The present invention is aimed at preventing these drawbacks from occurring by incorporating a comfortable restraint system formed by a safety belt which, remaining in contact with the user's body, maintains a certain gap between the belt and the body which alleviates the pressure caused by the belt throughout the entire width thereof over the body, thereby preventing the aforementioned discomfort.

Furthermore, the fixed anchoring system of the belt and the retractor device to adapt the new safety belt are modified.

SUMMARY

With the aim of achieving the objectives and avoiding the aforementioned drawbacks, the present invention discloses a comfortable restraint system comprising a safety belt made up of a textile strap, a permanent anchoring device for fastening one end of the belt, with means for coupling a fastening tongue, a removable anchoring device to house a flap which incorporates a fastener through which the belt passes and a retractor that houses the other end of the safety belt that is not in use.

The novelty of the invention resides in the fact that the safety belt comprises a chamber attached longitudinally on each side of the textile strap and pneumatically connected to a compression system located in the permanent anchoring device.

Therefore, the permanent anchoring device incorporates connector outlets and the chambers, at one of the ends thereof, have adapters that couple to the connector outlets such that the chambers are pneumatically connected to the compression system.

The restraint system is intended to be placed in a vehicle that incorporates an electronic braking system governed by a control unit, with the aim of synchronizing the restraint system with the electronic braking system, such that the restraint system is also governed by the control unit. This way, the air extraction flow of the chambers can be proportional to the braking intensity.

This comfortable restraint system preferably incorporates a depressurization mechanism which reduces the pressure of the belt on the user's body when expanded, thereby separating it from the user's body. The depressurization mechanism can be synchronized with the electronic braking system, such that the collapse is proportional to the braking intensity and the depressurization mechanism does not have to return to its collapsed position to completely adjust the belt to the user's body, rather only partially.

The chambers are preferably configured in the form of tubes with a high degree of flexibility and made of polyurethane, for example, so that they quickly adapt to the different forms, being either inflated or deflated, and they are attached to the textile strap by means of a lining that covers them, which is preferably sewn to the same.

BRIEF DESCRIPTION OF THE FIGURES

To complete the description of the invention, and for the purpose of helping to make the features thereof more readily understandable, according to a preferred exemplary embodiment thereof, a set of drawings is included wherein, by way of illustration and not limitation, the following figures have been represented.

A list of the references used in the figures is provided below:
1. Safety belt.
2. Permanent anchoring device.
3. Removable anchoring device.
4. Belt retractor.
5. Air chambers.
6. Textile strap of the belt.
7. Connector outlets.
8. Anchor tongue.
9. Adapters.
10. Fastener of the flap.
11. Flap of the belt.
12. Depressurization mechanism.

DETAILED DESCRIPTION

The present invention relates to a comfortable restraint system comprising a safety belt 1 by means of which a contactless area is created between the user's body and the safety belt 1, which allows for the continuous pressure of the safety belt 1 to be reduced.

Figure 1:
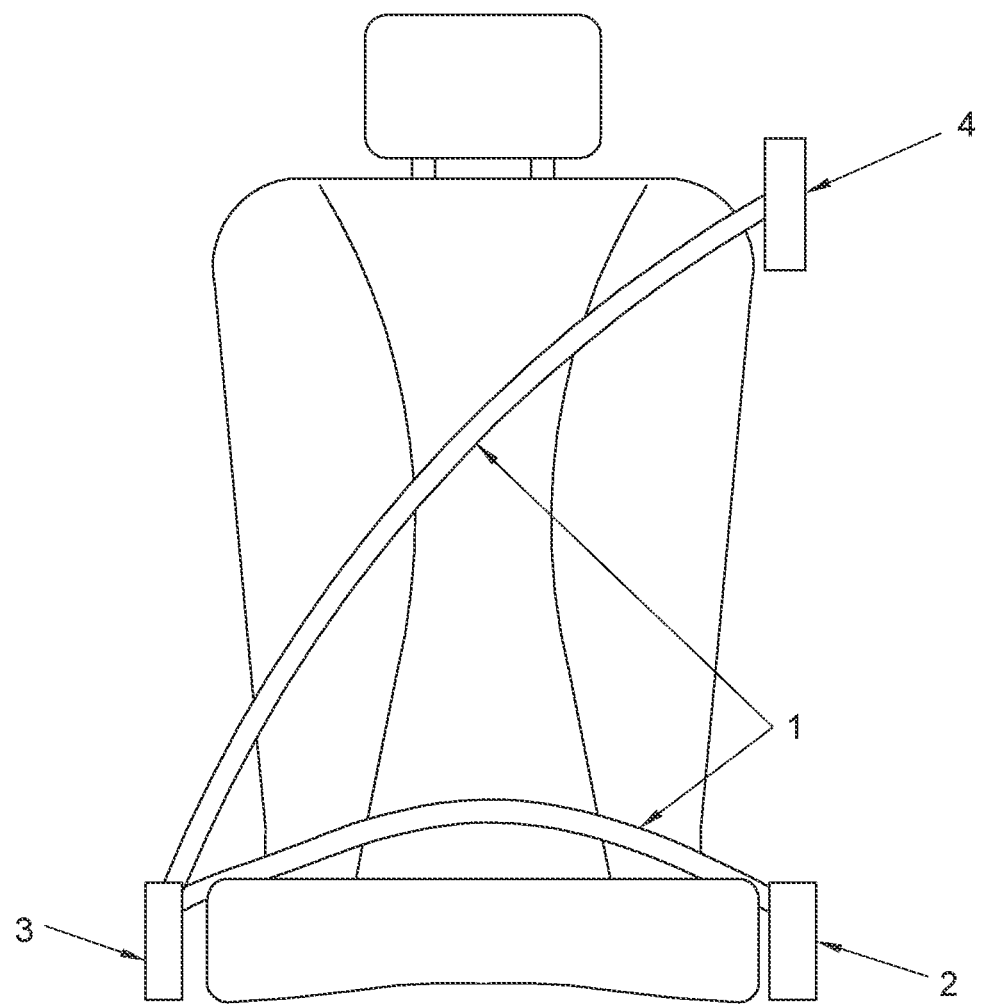
FIG. 1 shows a front view of the comfortable restraint system of the invention placed in a vehicle seat.

As shown in FIG. 1, the comfortable restraint system of the invention is configured by means of a safety belt 1, a permanent anchoring device 2, a removable anchoring device 3 and a retractor 4 to reel the belt 1. Each one of the components is described in detail below.

Figure 3:
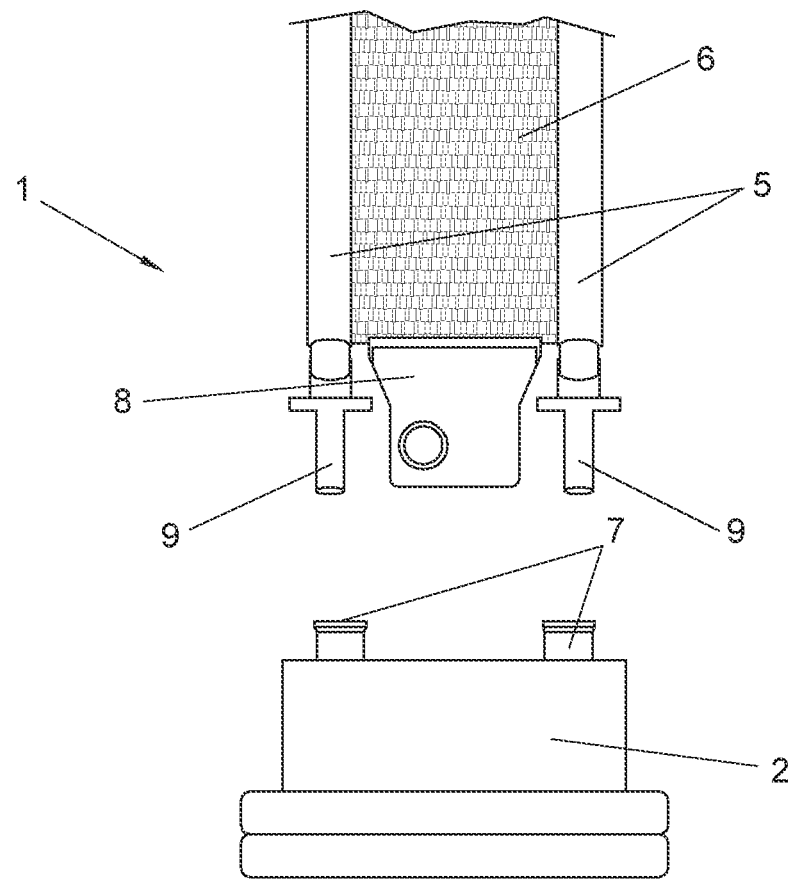
FIG. 3 shows a view of the permanent anchoring device of the belt and the end of the belt before being coupled, showing the fixed anchor tongue of the belt and the pneumatic connectors for supplying air to the chambers.

FIG. 3 represents the permanent anchoring device 2 of the restraint system and one of the ends of the safety belt 1, which is intended to be fastened to the permanent anchoring device 2. The other end of the belt 1 is fastened to the retractor 4.

As can be seen in FIG. 3, the belt 1 is made up of a textile strap 6 and a chamber 5 attached longitudinally on each side of the textile strap 6. Each one of the chambers 5 ends at an adapter 9 and is joined to the textile strap 6 by a sewn lining to cover it, for example, both chambers 5 being completely integrated to the textile strap 6 and making up a safety belt 1 without practical differences of flexibility or width with respect to known safety belts. Furthermore, the textile strap 6 ends at an anchor tongue 8.

The permanent anchoring device 2 is solidly joined to the vehicle chassis. The permanent anchoring device 2 incorporates an opening for inserting the anchor tongue 8 of the belt 1 and connector outlets 7 for coupling the adapters 9 to thereby supply the chambers 5 of the belt 1 with air.

The inside of the permanent anchoring device 2 is not shown. The permanent anchoring device 2 incorporates a system for mechanically fastening the anchor tongue 8 of the belt 1 and a compression system with a proportional valve, in charge of supplying and extracting air to and from the chambers 5.

It must be taken into account that both the fastening of the anchor tongue 8 to the permanent anchoring device 2 and the connection of the adapters 9 to the connector outlets 7 are pre-established in the vehicle and are not elements that are accessible to the user. As for the anchor tongue 8, it is solidly fixed to the inside of the permanent anchoring device 2 and, therefore, is also not accessible to the user of a vehicle. As for the adapters 9, they are solidly joined both to the chambers 5 and to the connector outlets 7, preferably by means of soldering, such that they are not joined in a removable way and therefore cannot be manipulated by the user.

Thus, by fastening the adapters 9 to the connector outlets 7 the safety belt 1 is pneumatically connected to the permanent anchoring device 2 such that, by means of the compression system, air can be supplied to or extracted from the chambers 5 at will, as needed.

Figure 5:
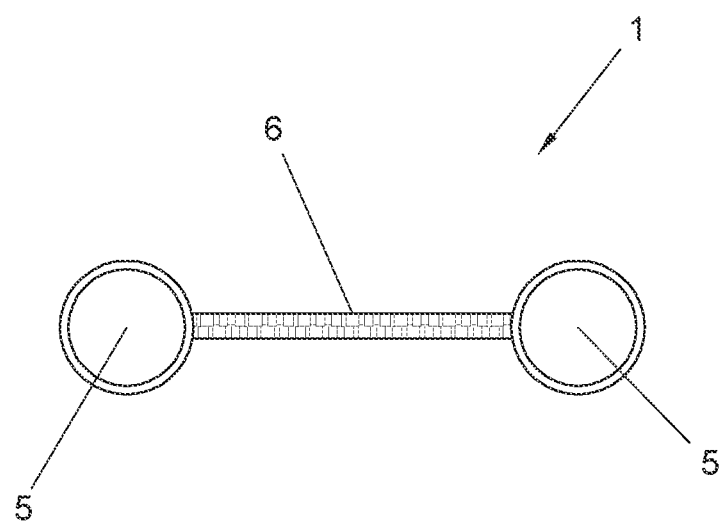
FIG. 5 shows a cross section of the safety belt, showing the textile strap and the air chambers located on the two sides thereof.

FIG. 5 shows a cross section of the safety belt 1 where it can be seen that the chambers 5 are preferably formed by means of hollow tubes made of a highly flexible material, such that they can quickly assimilate the dimensional changes caused by the entry or exit of air. This material could be polyurethane, for example.

Figure 4:
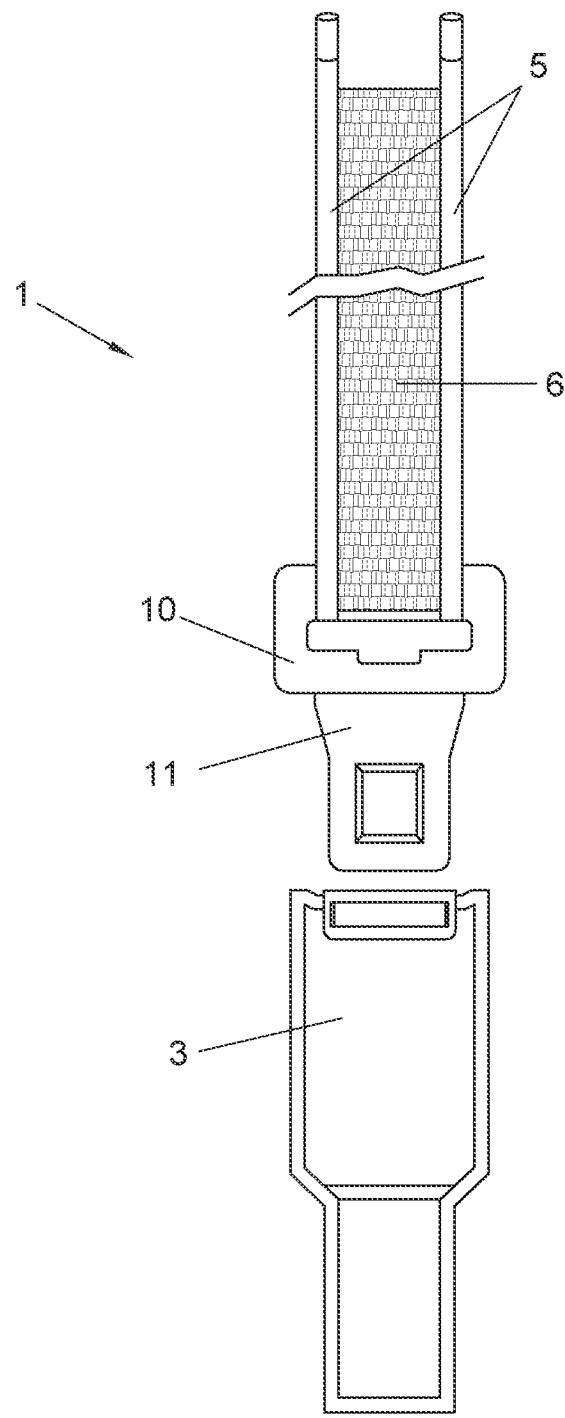
FIG. 4 shows a view of the safety belt passing through the fastener of the flap and the anchoring device where the flap of the belt is inserted.

On the other hand, FIG. 4 shows the removable anchoring device 3 intended to receive the flap of the belt 11 when the user puts on the belt 1. The flap 11 is joined to a fastener 10 through which the belt 1 passes so that it can be adjusted to the user being restrained. The fastener 10 has dimensions that are greater than those in the state of the art, since it must be able to slide over the chambers 5 of the belt 1 once they are inflated.

The retractor of the belt 4 is not shown in detail in the Figures. One end of the belt 1 is housed in the retractor, as was previously mentioned, being fixed to a shaft capable of rotating, on which the belt is rolled as it is accommodated inside the retractor 4, in order to house the part that is not in use. However, the retractor 4 of the invention is different from known retractors in that it needs a system that prevents the chambers 5 from being introduced in the retractor 4 when they are inflated. Thus, one device that can be used to prevent this effect consists of rollers locked to the belt 1 on either side thereof, such that the belt 1 is compressed between the rollers but can slide between them, preventing air from entering the chambers 5 beyond the location of the rollers.

Figure 2:
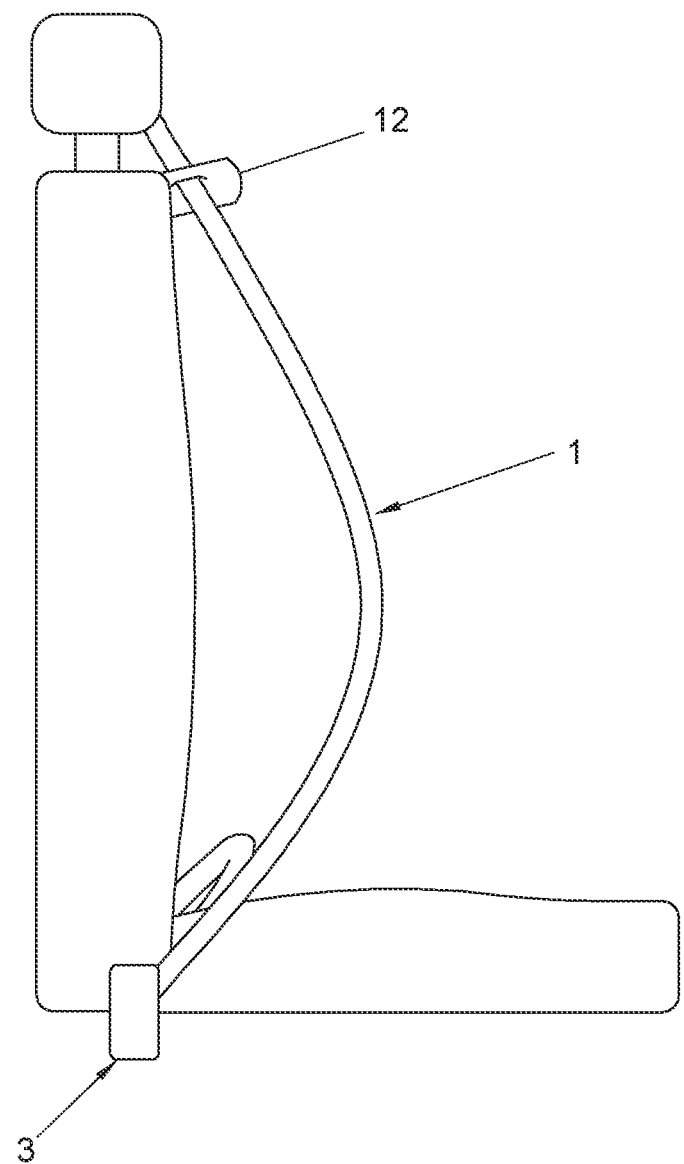
FIG. 2 shows a side view of the restraint system of the invention incorporating a depressurization mechanism.

Furthermore, the system can incorporate an electromechanical depressurization mechanism 12 as shown in FIG. 2. This depressurization mechanism 12 is in charge of slightly separating the belt 1 from the user's body, such that it reduces the pressure when it is not necessary for the belt 1 to be fitted very tightly. The depressurization mechanism 12 can be located in proximity to the retractor 4, in an area of the seat near the retractor 4 or in a location in which the belt 1 can be perpendicularly separated with respect to the user's body.

The depressurization mechanism 12 can be made up of a plate with the ability to rotate around an articulation, such that the mechanism can collapse or expand in order to move the belt closer to or away from the user's body. The plate incorporates a hole through which the belt 1 passes, such that when it expands, it also separates from the body of the belt 1 user, loosening the pressure of the belt 1 on the user.

Having described the components of the comfortable restraint system of the invention, it is possible to understand that if the compression system insufflates air, the chambers 5 are filled and make it so the contact of the belt 1 on the user's body only takes place at the outer areas of the belt 1, those of the chambers 5, the inner area, consisting of the textile strap 6, remaining free and providing a space that is not in contact with the user's body, thereby reducing the pressure on the same, as well as the heat generated by contact, which leads to greater comfort for the user.

With regard to the operation of the restraint system, it must be mentioned that it is governed by the vehicle's control unit which, using sensors, is in charge of gathering the necessary information on the state and behavior of the vehicle.

By means of the information gathered by the control unit, the braking activity is driven by an electronic braking system incorporated by the vehicle, always based on the needs at the time, and such that the braking percentage that each of the vehicle's wheels receives every day is controlled. This way, by actuating the vehicle's brake pedal, the braking intensity is controlled, making it more or less intense and based on the requirements.

This way, the electronic braking system is synchronized with the restraint system of the invention, mainly by means of the compression system, which is in charge of supplying and extracting air to and from the chambers 5 of the belt 1. This means that the air extraction flow of the chambers 5 is proportional to the braking intensity.

With regard to the operation of the restraint system, both the belt 1 itself and the depressurization mechanism 12 are activated once the vehicle user puts on the belt 1, buckling the flap 11 in the removable anchoring device 3, and turns on the vehicle's engine, without the brake being activated. In this situation, the compression system is activated and, by means of the proportional valve, supplies the chambers 5 with air, which inflate to allow the belt 1 to be slightly separated from the user's body, and, if the depressurization mechanism 12 is incorporated, it is activated to provide a slight gap between the belt and the user's body.

On the other hand, by actuating the brake pedal, the instructions sent to the compression system are to extract air from the chambers 5 such that the belt 1 immediately tightens to the driver's body, the system understanding that it is possible that a restraint will be necessary. In this case, the amount of air extracted may vary, depending on the braking intensity and in a way that is proportional to the same, as was previously indicated.

In the same way, the depressurization mechanism 12 is also synchronized with the electronic braking system such that, when in the expanded position, with a minimum pressure on the user's body, if the brake pedal is actuated, the depressurization mechanism 12 collapses to tighten the belt to the user's body. This collapse is preferably proportional to the braking intensity.

Furthermore, the restraint system can also be synchronized with the adaptive cruise control, a method by means of which the speed at which the user wants to travel is automatically controlled and which, with the help of a radar system, also automatically controls the distance of the vehicle with respect to the vehicle ahead of it, slowing down the vehicle if necessary to maintain said safety distance.

Lastly, it must be taken into account that the present invention must not be limited by the embodiment described herein. Other configurations may be carried out by those skilled in the art based on the present description. Accordingly, the scope of the invention is defined by the following claims.

The invention claimed is:

1. A comfortable restraint system located in a vehicle incorporating an electronic braking system controlled by a control unit, and comprising a safety belt configured by a textile strap, a permanent anchoring device comprising means for coupling an anchor tongue joined to one end of the textile strap, a removable anchoring device and a retractor for the safety belt, wherein:
   the safety belt comprises an air chamber attached longitudinally on each side of the textile strap,
   the permanent anchoring device comprises at least two connector outlets for supplying pressurized air through a compression system, and
   each one of the air chambers comprises an adapter configured to be joined to a connector outlet, such that the air chambers are pneumatically connected to the compression system, which is controlled by the vehicle control unit,
   wherein the restraint system is synchronized with the electronic braking system of the vehicle, such that an air extraction flow of the air chambers is proportional to a braking intensity of the electronic braking system.

2. The comfortable restraint system according to claim 1, further comprising a depressurization mechanism which, when expanded, reduces the pressure of the belt on a user's body.

3. The comfortable restraint system according to claim 2, wherein the depressurization mechanism is synchronized with the electronic braking system, such that it collapses proportionally to the braking intensity, partially adjusting the pressure of the belt to the user's body.

4. The comfortable restraint system according to claim 1, wherein the air chambers are configured in the form of tubes with a high degree of flexibility, such that they quickly adapt to different forms depending on whether they are inflated or deflated.

5. The comfortable restraint system according to claim 4, wherein the air chambers are made of polyurethane.

6. The comfortable restraint system according to claim 4, wherein each air chamber is joined to the textile strap by a lining that covers the chamber.

7. The comfortable restraint system according to claim 6, wherein the lining is sewn to the textile strap.

\* \* \* \* \*